Figure 1:
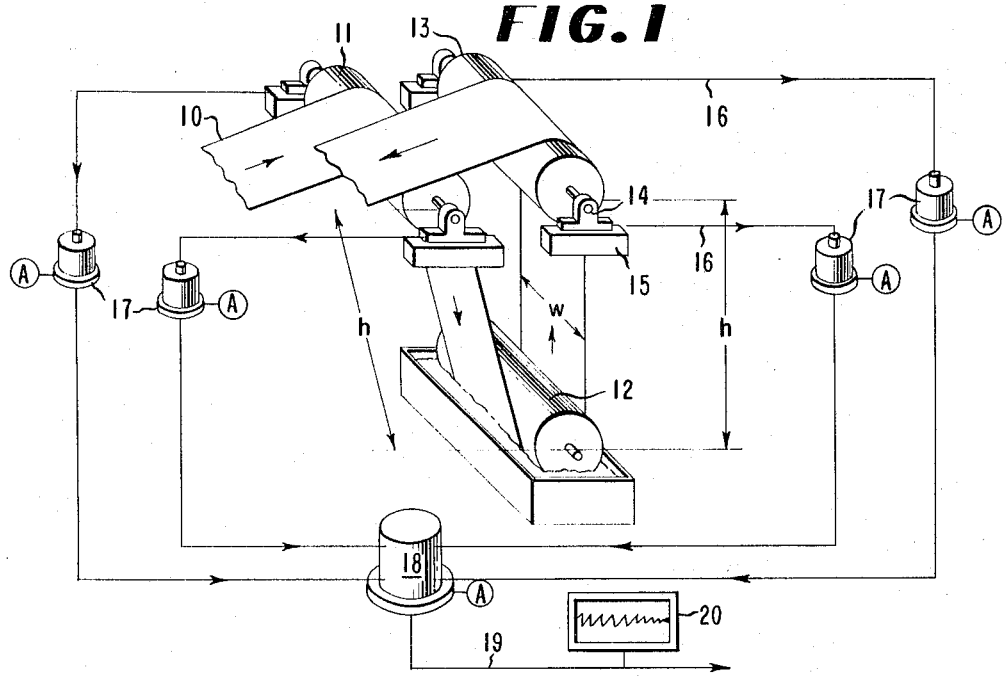

CONTROLLING COATING WEIGHT THROUGH DIFFERENTIAL IN TENSION

Filed Nov. 4, 1963

INVENTOR
THOMAS DOUGLAS FENLEY

BY Lynn Barratt Morris

ATTORNEY

United States Patent Office 3,303,044
Patented Feb. 7, 1967

3,303,044
CONTROLLING COATING WEIGHT THROUGH DIFFERENTIAL IN TENSION
Thomas Douglas Fenley, Hightstown, N.J., assignor to E. I. du Pont de Nemours and Company, Wilmington, Del., a corporation of Delaware
Filed Nov. 4, 1963, Ser. No. 321,248
4 Claims. (Cl. 117—34)

This invention relates to a method for continuously measuring the amount of coating applied to a moving web of flexible material during a coating operation.

At the present time, the measurement of coating weight is accomplished by various methods. One method involves measuring or comparing the rate of consumption of coating material with the web speed. It can easily be seen that this method does not result in a rapid determination of coating weight. Because of the slow speed of response, this method is unsuitable for use in conjunction with an automatic control system. Other methods involve the measurement of radiation, such as X-ray or beta-ray that is absorbed by the coated material. In the coating of photographic emulsions, the coating weight may be measured by X-ray fluorescence caused by the silver in the emulsion, but this system only operates if certain elements are present in the coated material.

To provide control in a coating operation, any coating weight gauge must be capable of determining the unit weight immediately after application of the coating; so that immediate changes can be made to vary the amount of coating applied. Since at this point most coatings have not acquired their final properties, the coating should not be contacted physically. In the coating of sensitive materials, such as photographic emulsions, most of the existing methods do not give satisfactory results. The use of radiation presents the problem of exposure of the sensitive emulsion. Also, in a radiation system, the weight of the uncoated film base and its absorption characteristics must be considered in the calibration of the system. Therefore, when using a radiation system, all products must have a separate calibration with the readout on an index rather than a scale of absolute units.

It is, therefore, an object of this invention to provide a method of continuously, rapidly, and accurately measuring the coating weight while the coating material is being applied. Another object is to provide a method of measuring coating weight that is non-destructive to the coating and does not involve physical contact with the coated surface. A related object is to provide a method of measuring coating weight that is independent of the nature of the coating and the substrate web, i.e., a method that is applicable to all types of flexible web coating operations. Yet another object is to provide a method that does not upset or interfere with the coating operation. A further object is to provide a reading of coating weight in absolute units. A still further object is to provide a method that is economical, efficient, simple, and requires little or no maintenance. Additional objects will be apparent from the following description of the method of the invention.

The method of this invention comprises:

(1) Determining the tension in a vertically disposed segment of the uncoated part of a continuous and moving web;

(2) Applying a coating to a surface of the moving web;

(3) Determining the tension in a vertically disposed coated segment, preferably of a length equal to the uncoated segment of the moving web; and (4) Computing the difference in tension between the tensions determined in accordance with steps 1 and 3.

In the method just described, the webs are preferably disposed during steps 1 and 3 in nearly vertical position which may be vertical or within 30° from the vertical. To avoid instrument compensation, the coated and uncoated segments should move in substantially identical parallel paths and equal distances about the rollers. Also, the coating should be applied at the bottom end of the uncoated segment that likewise constitutes the bottom end of the coated segment of which segments the tensions are determined. That is, the tensions of the respective segments should be determined immediately prior to and immediately following the application of the coating.

While the method just described is not limited to any particular apparatus, applicant has devised a simple and reliable apparatus and this apparatus comprises:

(a) A tension measuring roller over and partly around which a moving web can pass;

(b) A coating roller below the tension roller adapted to receive the web and to change its direction about 180°;

(c) Means adjacent the coating roller for applying a coating to the web;

(d) A tension measuring roller above the coating roller over and partly around which a coated, moving web can pass; and (e) Means for determining the difference in tension in the moving web between (1) the first tension measuring roller and the coating roller, and (2) the latter roller and the second measuring roller.

The apparatus just described, as will be apparent from the following description and accompanying drawings, embodies hydraulic and pneumatic means associated with the tension measuring rollers.

The invention utilizes the principle that the difference in tension is proportional to the weight of the material coated on the web. The invention is useful in most applications where a moving web is being coated. It is particularly useful in measuring the coating weight applied in the manufacture of photographic film. In this process the photographic emulsion must be protected from any surface contact until it is dried and also from any exposure to radiation that will initiate a photochemical reaction.

The invention will be further illustrated by reference to the accompanying drawings wherein FIG. 1 is a schematic diagram showing the method and apparatus of the invention.

Figure 2:
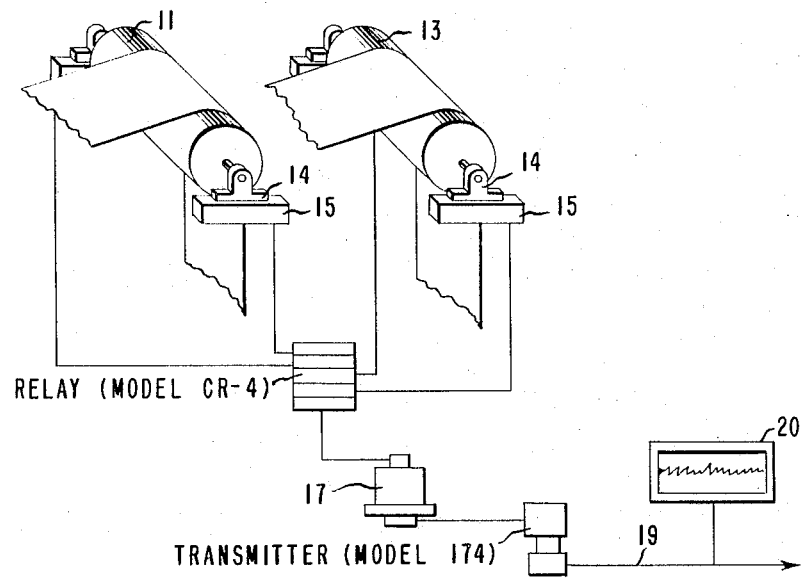

FIG. 2 is a schematic view of an alternative embodiment of the invention showing the tension rollers and a different hydraulic-pneumatic system.

With reference to the drawings, where in the same reference numerals refer to the same parts throughout the several views, and more particularly to FIG. 1, a moving web 10 passes over and partly around a first tension measuring roller 11 and then downwardly, upwardly and around a coating roller 12. After being coated, the web passes over and partly around a second tension measuring roller 13, the coating being outermost. The tension measuring rollers are located so that tension can be determined immediately before and immediately after the coating operation. The segment of the web between the first tension measuring roller 11 and the coating roller 12 and the segment between the coating roller and the second tension measuring roller 13 are essentially vertical and of equal height $h$ and width $w$. The web should pass over the tension measuring rollers at a constant though not necessarily equal angle of wrap, so as to provide reasonably accurate measurements. If the angle of wrap is not the same on both rollers 11 and 13, the measuring devices 15 on one must be adjusted to accommodate the variation.

The principle of operation may be explained as follows: The tension $T_1$ in the web prior to being coated is sensed by roller 11. The tension $T_c$ at the bottom of the coating roller will then equal the tension at roller 11 less the area of the web between the two rollers multiplied by the weight per unit area of the web $P_w$ or $$T_c = T_1 - (hw)P_w$$

The tension in the coated web $T_2$ measured at roller 13 will equal the tension at the bottom of the coating roller $T_c$ plus the area of the web between these two rollers multiplied by the weight per unit area of the web plus the weight per unit area of coating $P_c$ applied at the coating roller, or $$T_2 = T_c + hw(P_w + P_c)$$

The difference in tension $\Delta T$ between the two tension measuring rollers is $$\Delta T = T_2 - T_1$$
$$\Delta T = T_c - hw(P_w) + hw(P_w + P_c) - T_c = hwP_c$$

Since $h$ and $w$ are constant, $\Delta T$ is then a direct measure of $P_c$, the coating weight per unit area. In embodiments where the two segments are not of equal heights $h$, the above is not exactly true. In this situation the differences in height will cause a difference in the static tensions and they will not cancel out. Thus if unequal web heights are used, the apparatus used will have to contain additional means to offset or suppress the uncancelled static tension.

To sense the tension in the web, this embodiment uses a hydraulic/pneumatic system. The shaft on each end of the tension measuring rollers 11 and 13 is mounted in bearings 14 that are located on top of the hydraulic load cells 15. These load cells are force measuring devices and utilize the principle that the hydraulic fluid in the system is retained at a fixed volume and that any hydraulic pressure produced is proportional to the force applied to the cell through the bearings. The load cells have adjustable amplification, and this adjustment can be used to correct the pressure produced if the angle of wrap on one roller is different from that on the other. This embodiment uses two load cells on each roller. It is known that in many instances the tension on one side of a web will vary from the tension on the other side and the tension sensed by a load cell on one roller end is not representative of one-half the tension in the web. The sum of the tensions sensed by the two load cells on the roll will, however, be a true indication of the actual web tension at that particular roll.

The hydraulic pressure in the load cell is sent through a capillary 16 to a hydraulic/pneumatic pressure transducer 17. The damping action of the capillary insures that noise in the hydraulic system due to bearings, rolls and web flutter will not be present during the transmission of the pressure. The transmitter utilizes the principle of null balance of forces. Any change in the hydraulic pressure will act on a hydraulic bellows in the transmitter and will produce a pneumatic balancing pressure that is equal and opposite to the force of the hydraulic bellows. The operation and construction of the hydraulic load cells and hydraulic/pneumatic transducers as a unit are known. (See the bulletin DF–16576 entitled "Installation and Operating Instructions for Emery Variable Range Load Cell," published by the A. H. Emery Company, New Canaan, Conn.) The construction and operation of hydraulic load cells are disclosed in U.S. Patent 2,960,113 and the construction and operation of a transducer may be found in U.S. Patents 2,312,201, 2,359,236, 2,501,957; and bulletin 3302 entitled, "Nullmatic Temperature Transmitter Model 33," published by Moore Products Co., Philadelphia, Pa., and copyrighted in 1962.

Thus, the pressure signal from each load cell is converted into a pneumatic signal in the appropriate transducers and all the converted signals are sent to a computing relay 18. In this computer the difference in tension sensed by the two rollers is computed. The computer totals the signals from both load cells on each roller, subtracts the total signal of roller 11 from that of roller 13 and develops a signal 19 in terms of $h$ and $w$ that represents the actual coating weight per unit area $P_c$. The computer consists essentially of an assemblage of two relays. The first relay receives the four signals from the hydraulic/pneumatic transducers 17, the signals from roll 13 are added together and the signals from roll 11 are subtracted to form an output pressure signal. This signal is then the input to the second relay which has adjustable amplification and suppression, i.e., if there is no coating the output of this relay would produce a zero reading on the recorder 20. This relay has the amplification and suppression adjusted so that the final output signal is in terms of $h$ and $w$ to cover the required range of coating weights in the proper units.

An averaging relay model 68A4 made by Moore Products Company, Philadelphia, Pennsylvania, can be modified so that it will operate as the first relay. The construction and operation of this relay can be found by referring to bulletin AD68, entitled, "Nullmatic M/F Computing Relays," published by Moore Products and copyrighted in 1961 and U.S. Patents 2,359,236, 2,312,-201 and 2,501,957. The relay is modified so that the total of the signals from roll 11 is subtracted from the total of the signals from roll 13 and the result is divided by one. In using this relay, if the web is not coated, the tension on roll 11 would equal the tension on roll 13 and the relay output would be 3 p.s.i. which would produce a zero reading on the recorder. A pressure transmitter model 174 made by Moore Products and described in bulletin 17301 can be used as the second relay.

Alternatively, instead of having four hydraulic/pneumatic transducers, the hydraulic output signal from each load cell can be sent to a hydraulic computing relay, such as the computing relay, model CR–4 made by the A. H. Emery Company. This relay is a modified LT–4 totalizer as described in bulletin 591 published by A. H. Emery Company. The modification consists of inverting the top two piston-cylinder input assemblies with respect to the lower two piston-cylinder input assemblies, and reducing in size the output piston cylinder assembly to have the same area as each of the input assemblies. This relay will develop a signal that is proportional to $\Delta T$ or the coating weight. The relay output is sent to a hydraulic/pneumatic transducer where it will be transduced into a pneumatic signal as previously explained. The pneumatic signal will then be sent to a Moore Products model 174 transmitter for the proper amplification and suppression so that the final output signal will be in the proper units of coating weight.

The final signal 19 is a direct measure of the coating weight. The signal can then be sent to a recorder so that a permanent graphic record can be prepared, i.e., a standard two-pen, pneumatic 3–15 p.s.i. recorder with its chart drive synchronized with the moving web 10 so that the coating weight per unit area can be related to web footage. Also, if desired, the signal can be transmitted to a control system that will adjust the amount of coating applied to the web. Such a system can be one that will automatically adjust web speed, or coating temperature, or air pressure in an air-knife doctor, or any other process variable that affects coating weight either directly or indirectly.

In an exemplary operation of the invention, the output of four A. H. Emery hydraulic load cells is connected to a hydraulic computing relay A. H. Emery model CR–4. The relay output is sent to hydraulic/pneumatic transducer and then to a pressure transmitter, Moore Products model 174. The final signal is recorded by a recorder having a full scale calibration of 3 grams/dm.$^2$. The system has a sensitivity of $\pm 0.1\%$, and will sense a change in coating weight of 3 milligrams/dm.$^2$ when the height of the two segments $h$ is eigth feet and the width of the web $w$ is forty-five inches.

The method of the invention has been illustrated by a hydraulic/pneumatic system, but it is not intended to limit the method to such a system. Other means that continually sense the tension immediately before and after a coating operation without damaging the coating combined with a means for computing the difference between the two tensions may be used without departing from the spirit of the invention.

Such a system can be electronic, employing resistance strain gauges in tension-measuring load cells coupled with suitable electronic computing devices, e.g., amplifier, error sensing circuit, and electrical controller, that determines $\Delta T$ in terms of coating weight per unit area.

The method of the invention has many advantages over the prior methods of measuring coating weight. It has a fast response time for developing a coating weight signal that can be used for automatic control. It is a method that is unaffected by static web tension, web speed, ambient temperature, barometric pressure, and is insensitive to any buildup of electrostatic charge on the web. The method records directly in coating weight units instead of an index and the weight of the uncoated base material is self-compensating and does not enter into the calibration of the system. Also no physical contact with the coated surface is necessary and there is no radiation involved; the latter would involve problems of exposure during the coating of photographic emulsions.

An advantage of the invention is that it is of general utility and can be used in coating paper, films composed of cellulose derivatives or synthetic polymers, metal foils and even fabrics. It is especially useful in coating photographic products which are generally coated in the absence of actinic radiation and require dependable apparatus. Another advantage of the process and apparatus is that it does not require a coating weight gauge that needs calibration for each new product. Still additional advantages will be apparent to those skilled in the art from the foregoing description and attached drawings.

I claim:

1. A method for continuously measuring the amount of coating applied to a moving web of flexible material which comprises
   (1) determining the tension in a vertically disposed segment of the uncoated part of a continuous and moving web immediately prior to application of the coating to said segment;
   (2) applying a coating to a surface of the moving web;
   (3) determining the tension in a vertically disposed coated segment, traveling in direction opposite to that of the first recited segment and preferably of a length equal to the uncoated segment of the moving web and immediately following the step of applying said coating to said segment;
   (4) computing the difference in tension between the tensions determined in accordance with steps (1) and (3) and
   (5) adjusting the rate of applying the coating in accordance with any differences in tension to provide a continuous web which is uniformly coated throughout its entire length.

2. A process according to claim 1 wherein step (1) is carried out with the web travelling downwardly in a direction that is vertical to 30° from the vertical and step (3) is carried out with the web traveling upwardly and parallel to said direction.

3. A process according to claim 1 wherein the coating is a photosensitive coating.

4. A process according to claim 1 wherein the coating is an aqueous gelatino silver halide emulsion.

References Cited by the Examiner

UNITED STATES PATENTS

| | | | |
|---|---|---|---|
| 2,100,653 | 11/1937 | Umansky | 73—144 X |
| 2,583,078 | 1/1952 | Auburn et al. | 73—144 X |
| 2,798,345 | 5/1957 | Hags | 324—71 |
| 2,884,893 | 5/1959 | Kabelitz | 118—9 X |
| 2,942,352 | 6/1960 | Eicken-Estienne | 34—52 |
| 3,062,078 | 11/1962 | Hulls | 117 |

MORRIS KAPLAN, *Primary Examiner.*